(12) United States Patent
Webber

(10) Patent No.: US 12,213,851 B2
(45) Date of Patent: Feb. 4, 2025

(54) METHODS AND SYSTEMS FOR FORMING DENTAL ATTACHMENT FORMATION APPARATUSES

(71) Applicant: Align Technology, Inc., San Jose, CA (US)

(72) Inventor: Peter Webber, Redwood City, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 18/154,782

(22) Filed: Jan. 13, 2023

(65) Prior Publication Data

US 2023/0149142 A1    May 18, 2023

Related U.S. Application Data

(63) Continuation of application No. 14/939,246, filed on Nov. 12, 2015, now Pat. No. 11,554,000.

(51) Int. Cl.
| | |
|---|---|
| *A61C 13/15* | (2006.01) |
| *A61C 7/00* | (2006.01) |
| *A61C 7/14* | (2006.01) |

(52) U.S. Cl.
CPC ............ *A61C 19/003* (2013.01); *A61C 7/002* (2013.01); *A61C 7/146* (2013.01)

(58) Field of Classification Search
CPC ........ A61C 19/003; A61C 7/002; A61C 7/146
See application file for complete search history.

(56) References Cited

U.S. PATENT DOCUMENTS

| | | |
|---|---|---|
| 5,820,368 A | 10/1998 | Wolk |
| 6,386,864 B1 | 5/2002 | Kuo |
| 6,783,604 B2 | 8/2004 | Tricca |
| 6,790,035 B2 | 9/2004 | Tricca et al. |
| 6,947,038 B1 | 9/2005 | Anh et al. |
| 7,104,792 B2 | 9/2006 | Taub et al. |
| 7,160,107 B2 | 1/2007 | Kopelman et al. |
| 7,448,514 B2 | 11/2008 | Wen |
| 7,600,999 B2 | 10/2009 | Knopp |
| 7,766,658 B2 | 8/2010 | Tricca et al. |
| 7,771,195 B2 | 8/2010 | Knopp et al. |
| 7,871,269 B2 | 1/2011 | Wu et al. |
| 7,883,334 B2 | 2/2011 | Li et al. |
| 7,914,283 B2 | 3/2011 | Kuo |
| 8,235,715 B2 | 8/2012 | Kuo |
| 8,337,199 B2 | 12/2012 | Wen |

(Continued)

*Primary Examiner* — Nicholas D Lucchesi
*Assistant Examiner* — Hao D Mai
(74) *Attorney, Agent, or Firm* — Shay Glenn LLP

(57) ABSTRACT

Methods and systems for forming dental attachment formation apparatuses. Methods may include creating a virtual dental attachment formation apparatus including a body having a surface shaped to conform to contours of a virtual model of a patient's dentition, a well in the body that is shaped to receive a dental attachment, and a light path directed through the body to the well. A physical dental attachment formation apparatus may be manufactured based on the virtual dental attachment formation apparatus. At least a portion of the body of the physical dental attachment formation apparatus may be made of a light transmissive material. The physical dental attachment formation apparatus may include an opaque portion arranged to keep light from illuminating another portion of the body other than the well.

18 Claims, 7 Drawing Sheets

(56) References Cited

U.S. PATENT DOCUMENTS

| | | |
|---|---|---|
| 8,401,686 B2 | 3/2013 | Moss et al. |
| 8,562,337 B2 | 10/2013 | Kuo et al. |
| 8,684,729 B2 | 4/2014 | Wen |
| 8,758,009 B2 | 6/2014 | Chen et al. |
| 9,119,691 B2 | 9/2015 | Namiranian et al. |
| 9,326,831 B2 | 5/2016 | Cheang |
| 9,655,691 B2 | 5/2017 | Li et al. |
| 9,700,385 B2 | 7/2017 | Webber |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,363,116 B2 | 7/2019 | Boronkay |
| D865,180 S | 10/2019 | Bauer et al. |
| 10,463,452 B2 | 11/2019 | Matov et al. |
| 10,492,888 B2 | 12/2019 | Chen et al. |
| 10,517,701 B2 | 12/2019 | Boronkay |
| 10,537,463 B2 | 1/2020 | Kopelman |
| 10,555,792 B2 | 2/2020 | Kopelman et al. |
| 10,588,776 B2 | 3/2020 | Cam et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,881,487 B2 | 1/2021 | Cam et al. |
| 10,912,629 B2 | 2/2021 | Tanugula et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,419,710 B2 | 8/2022 | Mason et al. |
| 11,471,253 B2 | 10/2022 | Venkatasanthanam et al. |
| 11,497,586 B2 | 11/2022 | Kopelman |
| 11,504,214 B2 | 11/2022 | Wu et al. |
| 11,523,881 B2 | 12/2022 | Wang et al. |
| 11,534,268 B2 | 12/2022 | Li et al. |
| 11,534,974 B2 | 12/2022 | O'Leary et al. |
| 11,554,000 B2 | 1/2023 | Webber |
| 11,564,777 B2 | 1/2023 | Kopelman et al. |
| 11,571,278 B2 | 2/2023 | Kopelman et al. |
| 11,571,279 B2 | 2/2023 | Wang et al. |
| 11,576,752 B2 | 2/2023 | Morton et al. |
| 11,589,955 B2 | 2/2023 | Medvinskaya et al. |
| 11,602,414 B2 | 3/2023 | Sato et al. |
| 11,642,194 B2 | 5/2023 | Boronkay et al. |
| 11,642,198 B2 | 5/2023 | Kopelman et al. |
| 11,666,415 B2 | 6/2023 | Wang et al. |
| 2004/0166462 A1 | 8/2004 | Phan et al. |
| 2005/0014105 A1 | 1/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0199142 A1 | 9/2006 | Liu et al. |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2014/0067334 A1 | 3/2014 | Kuo |
| 2016/0193014 A1 | 7/2016 | Morton et al. |
| 2017/0007359 A1 | 1/2017 | Kopelman et al. |
| 2019/0000592 A1 | 1/2019 | Cam et al. |
| 2019/0000593 A1 | 1/2019 | Cam et al. |
| 2019/0125497 A1 | 5/2019 | Derakhshan et al. |
| 2019/0262101 A1 | 8/2019 | Shanjani et al. |
| 2019/0298494 A1 | 10/2019 | Webber et al. |
| 2020/0000553 A1 | 1/2020 | Makarenkova et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2021/0147672 A1 | 5/2021 | Cole et al. |

METHODS AND SYSTEMS FOR FORMING DENTAL ATTACHMENT FORMATION APPARATUSES

CLAIM OF PRIORITY

This application is a continuation of U.S. patent application Ser. No. 14/939,246, filed Nov. 12, 2015, titled "DENTAL ATTACHMENT FORMATION STRUCTURE," now U.S. Pat. No. 11,554,000, which is herein incorporated by reference in its entirety.

BACKGROUND

The present disclosure provides methods, computing device readable medium, devices, and systems that utilize a dental attachment formation structure during dental treatment. Dental treatments involve restorative and/or orthodontic procedures to improve the quality of life of a patient.

For example, restorative procedures may be designed to implant a dental prosthesis (e.g., a crown, bridge, inlay, onlay, veneer, etc.) intraorally in a patient. Orthodontic procedures may include repositioning misaligned teeth and changing bite configurations for improved cosmetic appearance and/or dental function. Orthodontic repositioning can be accomplished, for example, by applying controlled forces to one or more teeth or a jaw of a patient over a period of time.

As an example, orthodontic repositioning may be provided through a dental process that uses positioning appliances for realigning teeth. Such appliances may utilize a shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement. Appliances can also be used for other dental conditions, such as application of medications, appliances to help with sleep apnea, and other issues.

Attachments are affixed to the one or more teeth of the patient (typically with an adhesive material, such as an attachment composite material) or directly cured to the tooth. These attachments interact with surfaces on the appliance to impart forces on one or more teeth.

Such systems typically utilize a set of appliances that can be used serially such that, as the teeth move, a new appliance from the set can be implemented to further move the teeth without having to take a new impression of the patient's teeth at every increment of tooth movement in order to make each successive appliance. The same attachments may be utilized or attachments may be added, removed, or replaced with other attachment shapes that may impart different force characteristics than a previous appliance and attachment combination (i.e., appliance and one or more attachments).

Currently, attachments can be formed by hand by a treatment professional (e.g., a doctor or assistant). In this process, a treatment professional selects an attachment material to be used and inserts the material into, a well, formed in a sheet of material, to the desired exterior shape of the attachment is provided to the treatment professional and the mixed attachment material is pushed into the well to form the attachment based on the shape of the well.

The attachment is then removed from the well and then put on a tooth and cured. The amount of attachment composite put into attachment wells on templates is uncontrolled, and therefore errors can occur. The absolute position of the attachment on the tooth is also subject to user error. In order to cure the material, a hand held ultraviolet light (UV light) is then inserted into the mouth of the patient in order to cure the attachments and placement of the light relative to the attachment is subject to error.

Accordingly, the positioning, orientation, and securing of attachments is typically done by a treatment professional at a dentist or orthodontist's office. However, treatment professionals can make one or more errors when mixing, forming, positioning, orienting, or securing one or more of the attachments and as such, the appliance and attachment combination may not fit together correctly or impart the correct one or more forces.

DETAILED DESCRIPTION

Figure 1:
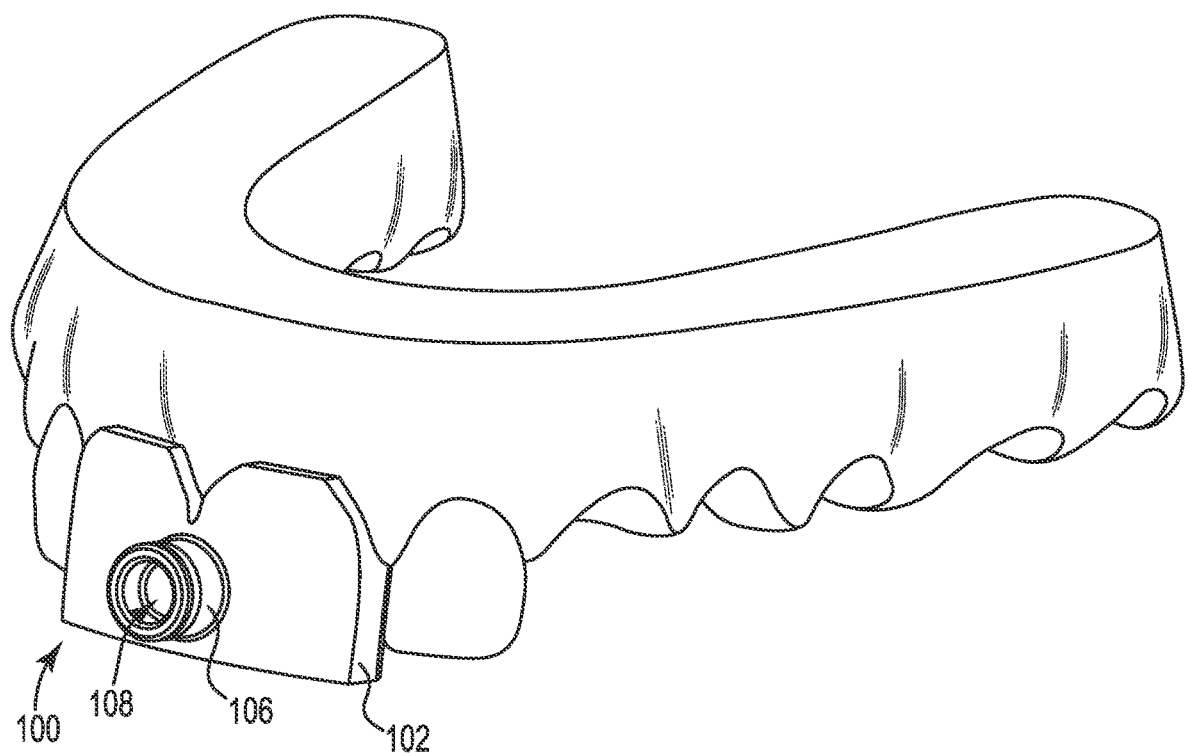
FIG. 1 illustrates an angled front view of a dental attachment formation structure with light mounting port provided thereon and positioned on a number of teeth of a patient according to a number of embodiments of the present disclosure.

The present disclosure provides methods, computing device readable medium, devices, and systems having a dental attachment formation structure. Such solutions should make mixing, forming, positioning, orienting, and securing attachments easier and quicker, and can make the patient's experience better than use of past procedures.

In one dental attachment formation structure embodiment, the apparatus includes a body having a first surface shaped to conform to the contours of an exterior surface of a tooth and including a portion of the first surface shaped to accommodate an attachment that is to be attached to the exterior surface of the tooth and a light source attachment structure for attachment of a light source to the body.

In the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, the designators "M" and "N", particularly with respect to reference numerals in the drawings, indicate that any number of the particular feature so designated can be included. As used herein, "a number of" a particular thing can refer to one or more of such things (e.g., a number of teeth can refer to one or more teeth).

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1 illustrates an angled front view of a dental attachment formation structure with light mounting port provided thereon and positioned on a number of teeth of a patient according to a number of embodiments of the present disclosure. In the embodiment of FIG. 1, the apparatus 100 includes a body 102 having a surface shaped to conform to the contours of an exterior surface of a tooth and a light source attachment structure 106 for attachment of a light source to the body. In this manner, light from a light source can be directed to the area around the surface of the tooth to cure a material used to form the attachment.

This can be beneficial for a number of reasons. For example, the uncured material used to form the attachment can be placed in a well on the side of the body facing the tooth (e.g., well 207 of FIG. 2), then the entire structure can be pressed against the surface of the tooth as shown in FIG. 1. This process compresses the material and forces it to conform to all surfaces (of the well and of the tooth). This can provide a better mating engagement between the surface of the tooth and a surface of the attachment that will be used to secure the attachment to the tooth.

In some embodiments, the light source can be positioned near the apparatus and light can be directed into the aperture 108. The aperture 108 can be designed such that light is directed at the location of the well (i.e., at the material to be cured).

This may mean that the aperture is positioned at a non-perpendicular angle to the surface of the tooth. Additionally, although the embodiment of FIG. 1 illustrates that the light source aperture is located in the middle of the exterior surface of the apparatus and generally perpendicular to that surface, it can be positioned on other places on the exterior surface or angles to that surface, or on other surfaces that would be suitable for directing light at the curable material.

Figure 2:
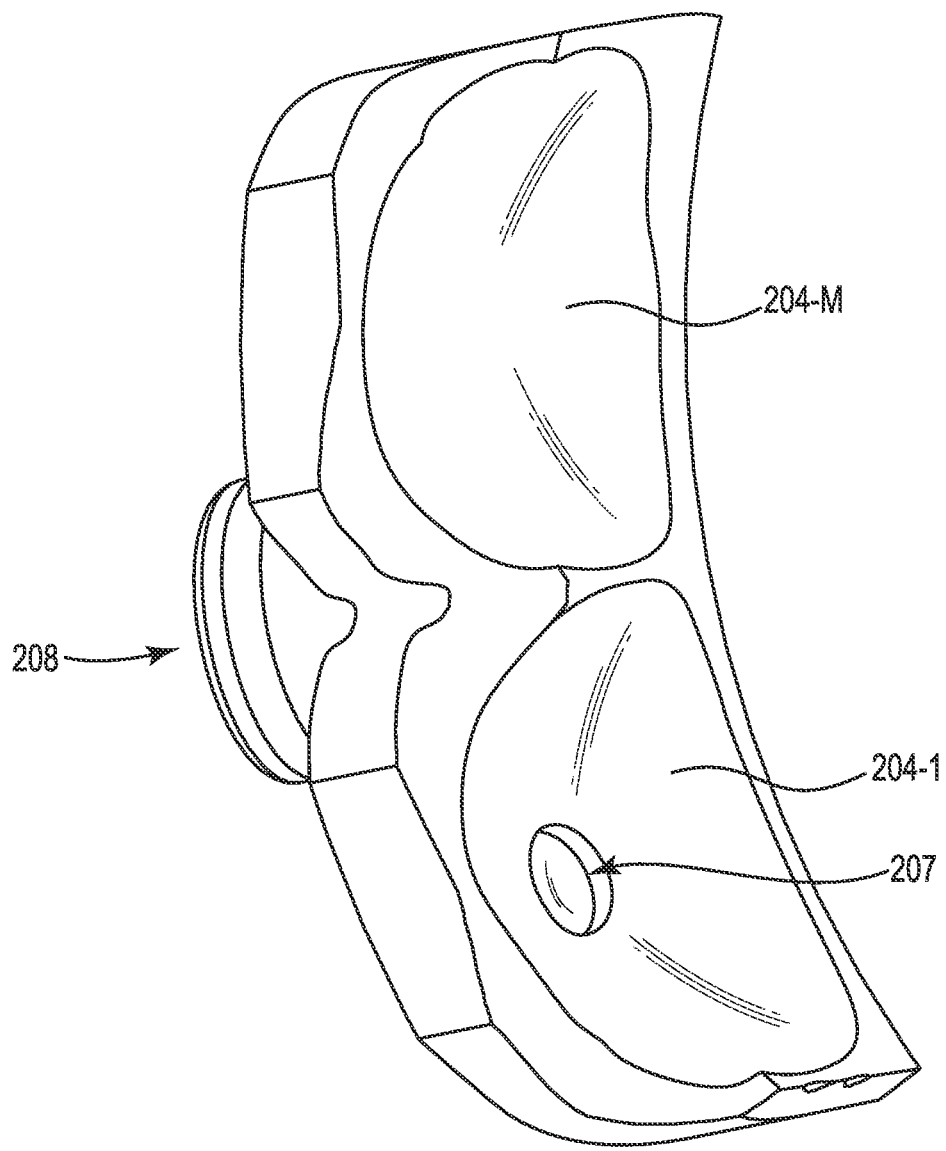
FIG. 2 illustrates an angled top view of a dental attachment formation structure with light mounting port provided thereon according to a number of embodiments of the present disclosure.

FIG. 2 illustrates an angled top view of a dental attachment formation structure with light mounting port provided thereon according to a number of embodiments of the present disclosure. In this figure, the dental attachment formation structure is shown from a top side so that both the aperture 208 for positioning a light source and the back side of the body of the formation structure can be viewed. In this embodiment, the body includes two surfaces 204-1 and 204-M that are shaped to be positioned against surfaces of two teeth. These surfaces can be used, for example, to position that dental attachment formation structure against the teeth as illustrated in FIG. 1. Surface 204-1 also includes a well 207 for placement of material used to form an attachment.

The well is used as a mold to form the shape of the attachment and as such the well is shaped to have an interior surface that will be used to form the shape of the exterior surface of the attachment. Uncured attachment material is packed into the well, such that it presses against the interior surfaces of the well. When the attachment material is removed from the well, it will have the shape of the desired attachment.

In some embodiments, one or more portions or all of the apparatus can be made from a light transmissive material to allow light from the light source to cure a light curable material in contact with the tooth. The light transmissive material can be transmissive to visible light or to certain wavelengths of light such as ultraviolet (UV) wavelengths or any other desirable wavelength range.

In prior concepts, treatment professionals may only have had access to a few standardized attachment shapes. In this manner, the options for treatment may have been restricted based on the limited forces that could be provided by the standard attachments. If any other attachment shape was desired, the treatment professional could file or grind the attachment surfaces to change its shape. This resulted in additional time spent in getting the proper shape, misshapen attachments that did not fit or function correctly, and other issues.

Although embodiments of the present disclosure can be used to form such standardized attachments, in some embodiments of the present disclosure, specialized attachments can be made available to a treatment professional, wherein the attachments are formed using the templates provided to the treatment professional. These templates can be designed based on the forces needed during treatment with regard to each specific patient. The templates can provide for precise positioning, orientation, and/or attachment and, in some embodiments, include premixed attachment material, which can provide precise selection of the type of attachment material, of the mixture material, and/or placement of the attachment material in the well.

Figure 8:
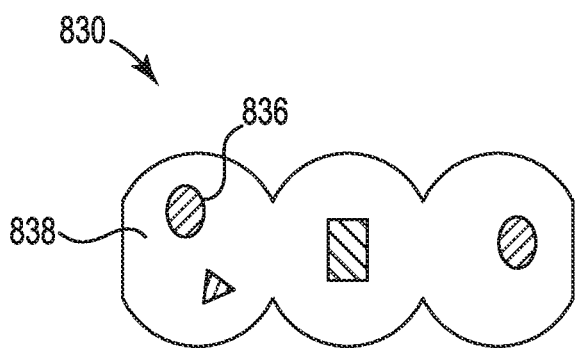
FIG. 8 illustrates a bottom view of a dental attachment formation structure according to a number of embodiments of the present disclosure.

Such specialization can also, for example, include the size of the attachment, shape of the attachment, and other suitable specialized characteristics. Examples, of various sized and shaped attachments are shown in FIG. 8. Accordingly, the patient will get a more customized treatment based on use of such embodiments. This can allow the apparatus to be specialized to the patient, but not be onerous on the treatment professional who, for example, may not have attachment design skills or capabilities.

In some embodiments, the treatment professional may also select one or more attachment materials or attachment types and/or select the location upon which they should be applied. Such embodiments can allow further customization of the apparatus and can be taken into account when the manufacture of the attachment templates are created. Further, in various embodiments, this customization can be made for each appliance (or for multiple appliances) in a set of appliances of a treatment plan.

In instances where the treatment professional is not as proficient in positioning and/or orienting the attachment, the template may include one or more engagement surfaces that can engage a surface of the patient's tooth to aid in proper positioning and/or orientation. As used herein, "positioning" is the locating of the attachment at a particular point on the surface of a tooth and "orienting" is the movement of the attachment in a manner that does not change its position on the surface of the tooth (e.g., a rotation of the attachment about an axis or movement of the attachment in one or more directions that does not change its position on the surface of the tooth).

For example, an attachment can be positioned at a particular point on the surface of a tooth and then can be oriented by rotating it, for example, parallel to the tooth surface, or along an axis perpendicular to the surface of the tooth. Other angles of rotation can also be used to orient the attachment without changing the attachment's position.

Figure 3:
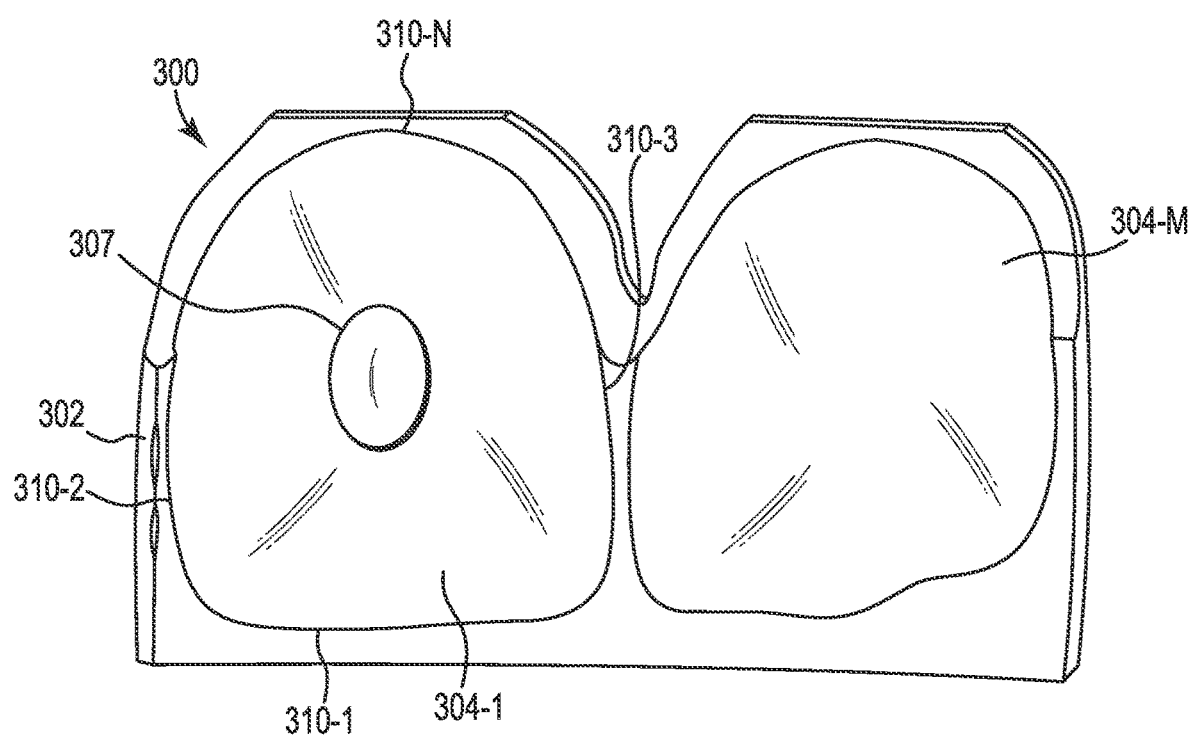
FIG. 3 illustrates a back view of a dental attachment formation structure according to a number of embodiments of the present disclosure.

FIG. 3 illustrates a back view of a dental attachment formation according to a number of embodiments of the present disclosure. In the embodiment of FIG. 3, the apparatus 300 (i.e., template) includes two surfaces 304-1 and 304-M that mate with the exterior surfaces of two teeth (as shown in FIG. 1). In this manner, attachments can be attached to one or more teeth using such a template.

In the illustrated embodiment of FIG. 3, the body 302 includes several registration surfaces that, when properly aligned against a particular surface of a tooth, can be used to aid in positioning and/or orientation of the attachment with respect to an exterior surface of the tooth (e.g., in this example, several exterior surfaces used as registration surfaces as will be discussed in more detail below). For example, in the embodiment of FIG. 3, suitable registration surfaces can be used to engage: the front surface of the tooth (e.g., surface 304-1 of the appliance), the bottom edge of the tooth (e.g., surface 310-1 of the appliance), a first side edge of the tooth 310-2, a second side edge of the tooth 310-3, the top edge of the tooth 310-N, and/or similar surfaces on the one or more other teeth that will engage surfaces on the template (e.g., 304-M of a tooth adjacent to the tooth onto which the attachment is to be placed). As discussed herein, embodiments can utilize one or more such surfaces to aid in the correct positioning and/or orientation of the template and thereby the attachment.

Also shown in the embodiment of FIG. 3 is the exit of the well 307 used to form an attachment. As discussed above, the light aperture (not shown in this figure, but shown in FIGS. 1 and 2 with respect to the surfaces shown in FIG. 3) can be positioned at any suitable location with respect to the well for purposes of curing the material in the well.

For example, as shown in FIGS. 1 and 2 in some embodiments, the aperture 108/208 would be to one side of the well 207 (i.e., if similarly arranged in this figure, the aperture would be centered between the two teeth 304-1 and 304-M). In such embodiments, one or more portions or all of the material used to construct the template may be designed to have optical properties that can filter, diffuse, magnify, collimate, and/or direct light in a different direction than the light directed toward the template. Such an arrangement would allow the light source to be centrally located on the body while allowing the light to be directed toward the areas needing curing. Such embodiments may allow for less expensive light sources to be used, among other benefits.

Figure 4:
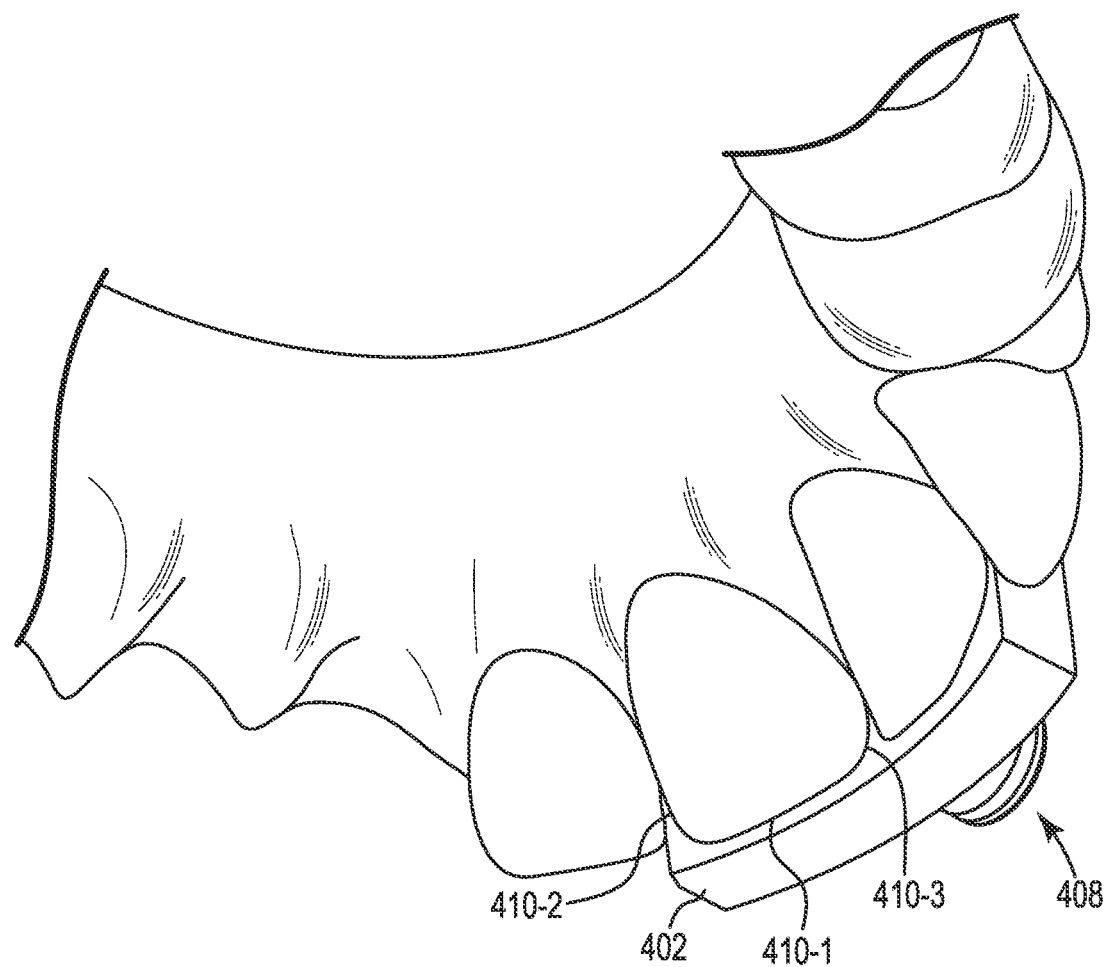
FIG. 4 illustrates an angled back view of a dental attachment formation structure with light mounting port provided thereon and positioned on a number of teeth of a patient according to a number of embodiments of the present disclosure.

FIG. 4 illustrates an angled back view of a dental attachment formation structure with light mounting port provided thereon and positioned on a number of teeth of a patient according to a number of embodiments of the present disclosure. In this figure, the body 402 of the dental attachment formation structure is positioned on multiple teeth of a patient to allow an attachment to be formed on one or more of the teeth and to provide an aperture 408 for directing light into the dental attachment formation structure.

In this embodiment, the body 402 has multiple registration surfaces 410-1, 410-2, and 410-3 that each engage with an exterior surface of a tooth to aid in correctly positioning and orienting the body 402 in relation to the multiple teeth and thereby aiding in positioning and orienting an attachment on the surface of a tooth. In the example of FIG. 4, surface 410-1 interacts with the bottom exterior surface of the tooth (or potentially the bottom of the back surface, bottom of the front surface, and bottom edge of the tooth), the surfaces 410-2 and 410-3 each interact with a side surface of the tooth. The more a registration surface conforms to the contours of the exterior surface of the tooth, the generally more precise the alignment with the tooth can be. Accordingly, in some embodiments, a registration surface can closely mirror the contours of the exterior surface of the tooth, to which it is to be applied, to better aid in aligning the dental attachment formation structure. Once aligned, the attachment material in the one or more wells formed on the dental attachment formation structure can be cured and the dental attachment formation structure can be removed.

Figure 5:
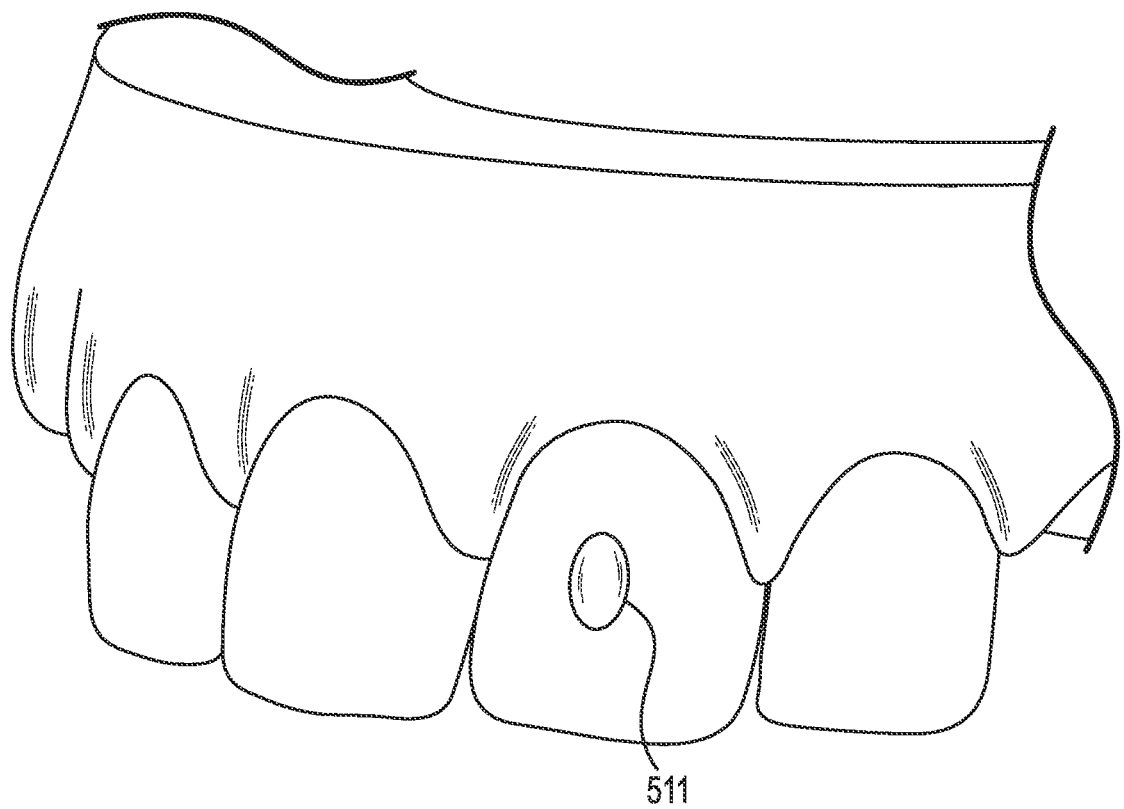
FIG. 5 illustrates a front view of a dental attachment formed on one of a number of teeth of a patient according to a number of embodiments of the present disclosure.

FIG. 5 illustrates a front view of a dental attachment formed on one of a number of teeth of a patient according to a number of embodiments of the present disclosure. As illustrated in FIG. 5, the attachment 511 remains on the tooth once the dental attachment formation structure is removed and, thereby, the attachment can be used to secure a dental appliance to the teeth of a patient or provide one or more forces to move one or more teeth of the patient.

Figure 6:
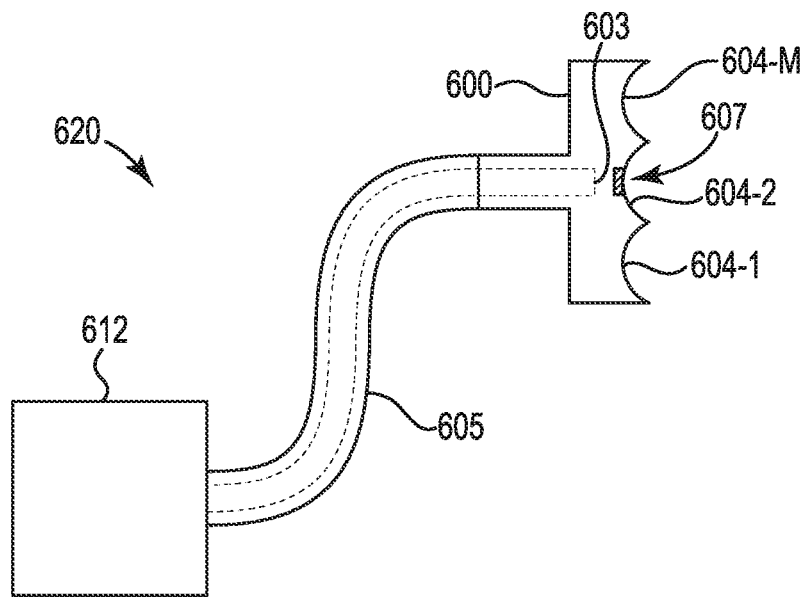
FIG. 6 illustrates an attachment formation system according to a number of embodiments of the present disclosure.

FIG. 6 provides an illustration of an attachment formation system according to a number of embodiments of the present disclosure. The embodiment of FIG. 6 includes a dental attachment formation system 620, having a light source 612 and a dental attachment formation structure apparatus 600. The dental attachment formation structure apparatus includes a body having a first surface shaped to conform to the contours of an exterior surface of a first tooth 604-2, a second surface shaped to conform to the contours of an exterior surface of a first tooth 604-1, and a third surface shaped to conform to the contours of an exterior surface of a first tooth 604-M.

The apparatus 600 also includes a portion of the first surface 604-2 shaped to accommodate an attachment (e.g., a well) 607 that is to be attached to the exterior surface of the first tooth. In the embodiment of FIG. 6, the surface 604-2 includes a well for making an attachment. The other surfaces, or their edges (as discussed above with respect to the embodiment of FIG. 3), can be used as registration surfaces to align the well 607 with the surface of the patient's tooth.

In some embodiments, more than one of the surfaces 604-1, 604-2, and 604-M can have a well thereon and one light source can be used to cure all of the curable material in the wells. In various embodiments, one or more of the surfaces 604-1, 604-2, and 604-M can have multiple wells provided thereon to create multiple attachments on a single surface (e.g., multiple attachments on a single tooth).

Some embodiments can have multiple light source attachment structures for attachment of the light source to the body. These may include direct connections to a light source or remote connections, as shown in the embodiment of FIG. 6 wherein the light source 612 directs light to the apparatus 600 via a conduit 605. A suitable conduit could, for example, be a fiber optic cable or light guide, among other structures that can provide a light path from a source.

In some embodiments, the light conduit 605 has a first end attached to the light source 612. The light from the light source 612 is directed into the first end of the light conduit 605 from the light source 612. The light source attachment structure can include a fitting, such as that shown in FIG. 1, for attachment of a second end of the light conduit 605 to the body 600.

In the embodiment of FIG. 6, the light path (indicated by the dashed lines within the light conduit and body) continues from the light conduit into the body at which point the light path terminates at 603. This termination can have any desirable geometric configuration and may be designed to provide one or more optical properties, such as filtering, diffusing, magnifying, collimating, and/or directing light in a different direction than the light directed toward the template.

As discussed above, in some embodiments, at least a portion of the body can be made of a light transmissive material (e.g., transmissive to UV, visible light, etc.) to allow light from the light source to cure a light curable material in contact with at least one of the first and second tooth. In order to cure the curable material, the light directed from the light source (or light path) has to be close enough to provide enough light to cure the material. However, embodiments that have a portion that is transmissive can allow the end of the light path or light source to be located further away from the well or at a different angle to the well, allowing for more design options with regard to the positioning and orientation of the one or more light sources/light paths and the one or more wells.

In another embodiment, the dental attachment formation apparatus includes a body having a surface shaped to conform to the contours of an exterior surface of a tooth. The surface includes a portion of the surface shaped to accommodate an attachment that is to be attached to the exterior surface of the tooth.

The body also includes at least one alignment surface configured to seat against an edge surface of the first tooth to aid in positioning of the attachment on the tooth. As discussed above, the apparatus can further include a light source attachment structure for attachment of a light source to the body.

Figure 7:
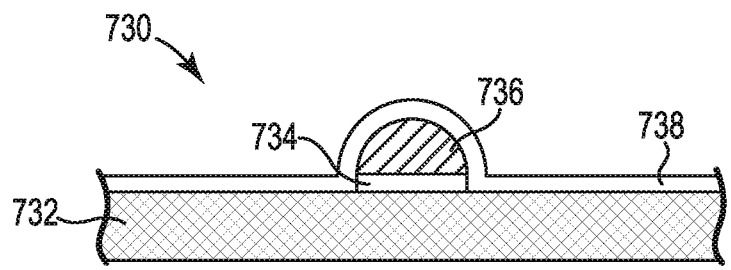
FIG. 7 illustrates a side view of an attachment formed on a tooth according to a number of embodiments of the present disclosure.

FIG. 7 illustrates a side view of an attachment formed on a tooth according to a number of embodiments of the present disclosure. In the embodiment of FIG. 7, an attachment 736 is formed on a tooth surface 762. The attachment 736 is adhered to the tooth using an adhesive material 734 although, in some embodiments, the attachment could be adhered directly to the tooth surface.

In the illustrated embodiment, the template 760 has a body 738 that is placed in contact with the exterior surface of the tooth in a manner such that the attachment will be either in direct contact or in indirect contact (i.e., in contact via the adhesive) in order to facilitate bonding of the attachment to the surface of the tooth. As discussed above, the curable material 736 and/or adhesive material 734 can be positioned in the well, some time during the manufacturing of the template, or after the manufacturing is complete (e.g., by a treatment professional).

One benefit of having a manufacturer fill the well is that it can be done with more precision and/or consistency than if different treatment professionals are filling the wells when they arrive at a treatment professional's office. One benefit of having the treatment professional fill (at least partially) the well is that they may be able to put the appropriate amount of material in the well to create the best adhesion to the exterior surface of the tooth.

FIG. 8 illustrates a bottom view of a dental attachment formation structure according to a number of embodiments of the present disclosure. In the embodiment illustrated in FIG. 8, the template 860 includes a body 838 having multiple wells 836 formed on one surface that is to be applied to a tooth (left most section having two wells therein) and multiple wells on several surfaces that are to be applied to a tooth (three surfaces illustrated with multiple wells on the surfaces of the three sections).

In some embodiments, the template may not be tooth shaped (e.g., may not have an elongate surface that is shaped similar to the exterior surface of a tooth). As shown, the template may be any suitable shape that will allow the attachment material to contact the surface of the tooth for purpose of securing the attachment to the tooth.

For example, in some embodiments, the template may be relatively planar with the exception of the wells. This may be beneficial, for example, because the cost and time in manufacturing a planar template may be less than a tooth contoured template.

Further, in various embodiments, the template may be constructed of flexible material, allowing the material to be bent against the exterior surface of the tooth. As discussed above, this may reduce cost and/or time in manufacturing, among other benefits.

The template may also be constructed of material that can be segmented or cut such that each section can, for example, be applied to non-adjacent teeth. One benefit of creating multiple attachments for different, non-adjacent teeth on adjacent sections is that cost and time in manufacturing may be reduced.

Additionally, in some embodiments (like the left most section of template body 838) multiple attachments can be created on one section and applied on different teeth. For example, the oval shaped attachment could be secured to a first tooth and the triangular shaped attachment secured to a second tooth.

In some such embodiments, different light source attachment structures can be provided on the template to allow one attachment to be cured while the one or more other attachments are not cured until they are positioned on their respective tooth. For example, the left, middle, and/or right sections can have different light source attachment structures allowing them to cure the material in their wells at different times or at substantially the same time.

Such embodiments would also allow the sections to be separated for placement and curing. For example, with respect to the embodiment of FIG. 8, the three sections can be separated from each other or one section can be removed and the other two kept together.

Some embodiments may have portions that are opaque to the light used to cure the attachments, such that the opaque portions keep the light from curing material until it is intended to be cured. For example, a template may have three attachment wells and a corresponding number of light paths that only illuminate a specific one of the attachment wells when a light is directed toward that corresponding path.

Some such embodiments may still have light paths that illuminate multiple wells. For example, if two attachments are to be attached to one tooth and a third attachment to a second tooth, the two attachments may be illuminated at the same time to cure them in their particular positions and orientations relative to each other and/or the tooth surface and the third may be separated by an opaque material, such that it can be applied to a second tooth at a later time.

Figure 9:
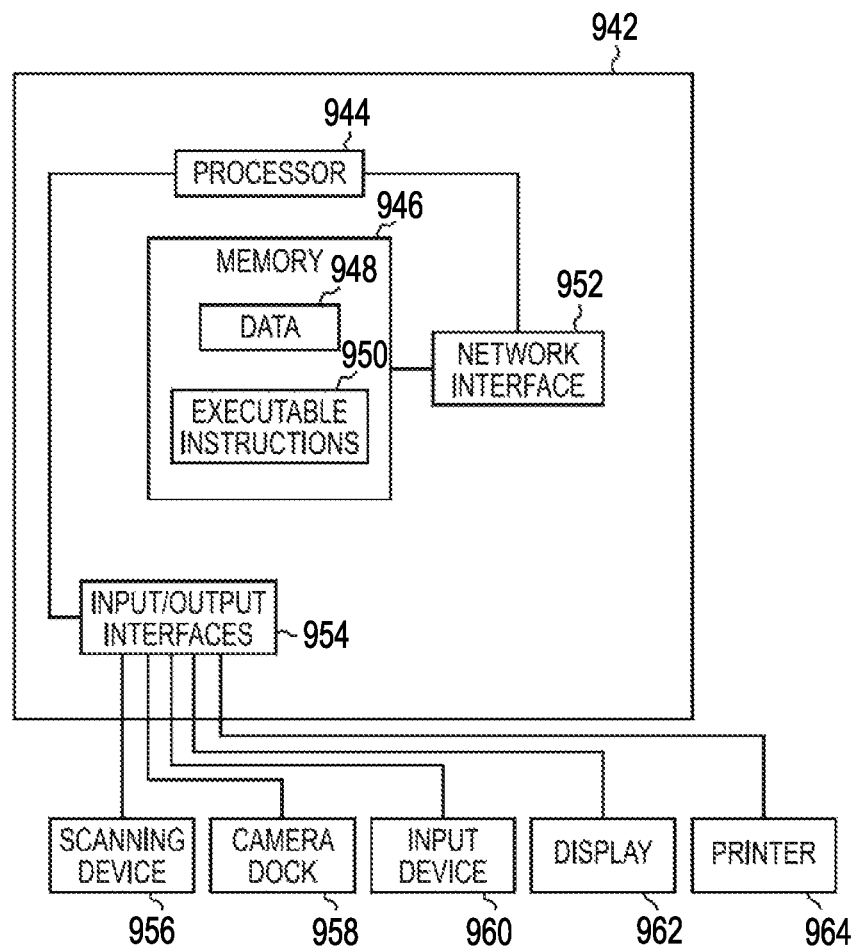
FIG. 9 illustrates a computing device that can be utilized according to one or more embodiments of the present disclosure.

In some embodiments, through use of the treatment plan and/or virtual modeling (e.g., utilizing a computing device such as that illustrated in FIG. 9), a dental appliance (e.g., an aligner for aligning teeth or jaws of a patient) can be made, for example, by thermal-forming a sheet of plastic over a physical dental mold. The physical dental mold, for instance, can represent an incremental position to which a patient's teeth are to be moved and can include attachment shapes formed in the mold.

In this manner, one or more surfaces of the dental appliance can engage with one or more surfaces of the one or more attachments (when the finished dental appliance is placed in the patient's mouth with the actual attachments). By having the attachments on the mold, the dental appliance is formed with the surfaces that will interact with the attachments.

The physical dental mold can be manufactured, for example, by downloading a computer-aided design (CAD) virtual dental model to a rapid prototyping process, such as, for example, a computer-aided manufacturing (CAM) milling, stereolithography, and/or photolithography process.

The dental mold (e.g., set of molded teeth and/or jaw) can be created from a virtual model of a number of teeth and/or jaw of a patient. A virtual model, for example, can include an initial virtual dental model and/or intermediate virtual dental model (wherein the teeth of the patient have been moved with respect to their actual physical position). A dental mold can be formed in accordance with a unique treatment file that, for example, identifies a patient, a stage of a treatment plan, the virtual model of the number of teeth and/or jaw, and/or whether the dental mold is of the upper and/or lower dental arch.

In some computing device system processes, a treatment file can be accessed by a rapid prototyping apparatus machine or direct fabrication device, such as a SLA or 3D printing machine, to form and/or create the dental mold. As discussed above, the result of the dental mold can include a set of molded teeth.

The set of molded teeth can include at least a replica of a number of teeth of the patient, but can also include other features such as gingival and jaw structures, among others. The dental mold can be used to make a dental appliance, for example, by creating a negative impression of the dental mold using polymeric sheets of material and vacuum forming the sheets over the dental mold, as discussed above.

For instance, a dental appliance can be formed by layering a thermoformable sheet of material and/or multiple sheets of one or more materials over the dental mold. The materials can include a polymeric material, for instance.

Generally, the dental appliance is produced and/or formed by heating the polymeric thermoformable sheet and vacuum or pressure forming the sheet over the dental mold (e.g., a number of molded teeth). A dental appliance can, for example, include a negative impression of the dental mold.

Such molding techniques can be used to create the templates for forming the attachments. In some embodiments, a mold used to create the dental appliance can be used to form an attachment template. However, in some embodiments, the template may be a generally planar sheet of material with a well formed therein that can be applied to an exterior surface of the tooth. This may be useful in instances where the treatment professional is skilled at positioning and/or orienting the attachment on the surface of a tooth.

FIG. 9 illustrates a computing device that can be utilized according to one or more embodiments of the present disclosure. For instance, a computing device 942 can have a number of components coupled thereto.

The computing device 942 can include a processor 944 and a memory 946. The memory 946 can have various types of information including data 948 and executable instructions 950, as discussed herein.

The processor 944 can execute instructions 950 that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 946 and/or the processor 944 may be located on the computing device 942 or off of the computing device 942, in some embodiments. As such, as illustrated in the embodiment of FIG. 9, the computing device 942 can include a network interface 952. Such an interface 952 can allow for processing on another networked computing device, can be used to obtain information about the patient, and/or can be used to obtain data and/or executable instructions for use with various embodiments provided herein.

As illustrated in the embodiment of FIG. 9, the computing device 942 can include one or more input and/or output interfaces 954. Such interfaces 954 can be used to connect the computing device 942 with one or more input and/or output devices 956, 958, 960, 962, 694.

For example, in the embodiment illustrated in FIG. 9, the input and/or output devices can include a scanning device 956, a camera dock 958, an input device 960 (e.g., a mouse, a keyboard, etc.), a display device 962 (e.g., a monitor), a printer 694, and/or one or more other input devices. The input/output interfaces 954 can receive executable instructions and/or data, storable in the data storage device (e.g., memory), representing a virtual dental model of a patient's dentition.

In some embodiments, the scanning device 956 can be configured to scan one or more physical dental molds of a patient's dentition. In one or more embodiments, the scanning device 956 can be configured to scan the patient's dentition and/or a dental appliance directly. The scanning device 956 can be configured to input data into the computing device 942.

In some embodiments, the camera dock 958 can receive an input from an imaging device (e.g., a 2D or 3D imaging device) such as a digital camera, a printed photograph scanner, and/or other suitable imaging device. The input from the imaging device can, for example, be stored in memory 946.

The processor 944 can execute instructions to provide a visual indication of a treatment plan, a dental appliance, and/or a one or more attachments on the display 962. The computing device 942 can be configured to allow a treatment professional or other user to input treatment goals. Input received can be sent to the processor 944 as data 948 and/or can be stored in memory 946.

Such connectivity can allow for the input and/or output of data and/or instructions among other types of information. Some embodiments may be distributed among various computing devices within one or more networks, and such systems as illustrated in FIG. 9 can be beneficial in allowing for the capture, calculation, and/or analysis of information discussed herein.

The processor 944, in association with the data storage device (e.g., memory 946), can be associated with the data 948. The processor 944, in association with the memory 946, can store and/or utilize data 948 and/or execute instructions 950 for creating and/or modeling interactions between an attachment and a tooth; interactions between an attachment and an appliance; interactions between a light source and an attachment, and/or combinations of interactions between one or more attachments, one or more teeth and/or other structure in the mouth of the patient, one or more light sources, and/or one or more appliances for moving teeth. The processor 944, in association with the memory 946 can, in addition to or alternatively, store and/or utilize data 948 and/or execute instructions 950 for creating and/or modeling attachment structures, attachment wells, attachment templates, direction of light toward a template appliance and/or through a template appliance or light path, optical properties of a template appliance or portion of a template appliance, and/or adhesive and/or releasable materials, as well as a virtual modeling of such items with or without a template appliance, appliance for moving teeth, and/or one or more teeth.

The virtual model of the dental appliance and/or attachments to attach a dental appliance to the teeth of a patient can be used to create a physical dental appliance and/or attachments, for instance, as discussed further herein. Such a virtual model or similar modeling technique can also be used to form a template (e.g., an appliance to form one or more attachments).

The processor 944 coupled to the memory 946 can, for example, include instructions to cause the computing device 942 to perform a method including, for example, providing a virtual model of a dental appliance having a shell configured to reposition a number of teeth of a patient or a template appliance for the formation of one or more attachments. In some embodiments, instructions can be provided to fill one or more wells with attachment material, shape the material within the one or more wells, and/or apply one or more releasable materials to one or more wells, through direction of a direct fabrication device or other such device.

In some embodiments, the processor 944 coupled to the memory 946 can cause the computing device 942 to perform the method comprising providing a treatment plan for the patient. The treatment plan can include a virtual model of a dental appliance having a shell configured to reposition at least one tooth of the patient. The virtual model can also include identification of a placement position and/or orientation of one or more attachments.

In various embodiments, the processor 944 coupled to the memory 946 can cause the computing device 942 to perform the method comprising virtually testing the attachment shape, location, orientation, type of attachment material to be used, and other suitable attachment characteristics to determine the best attachment and/or placement of the attachment.

Such analysis can be accomplished one or more times for a treatment plan. For example, if a treatment plan has 60 stages, it would be possible to have different attachments for each stage or possibly more, if desired. However, in many instances the attachment type, position, and/or orientation may be changed a few times during the treatment plan.

Through use of virtual modeling, attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth.

Further, the specialized nature of the design of such attachments can also allow the attachments to be made from different materials. In this manner, attachments during a treatment plan or even during one stage can be of a different material that may provide more specialized force distribution than was possible with standard attachments.

In some embodiments, the printer 694 can be a three dimensional or direct fabrication device that can create a dental appliance directly from instructions from the computing device 942. Embodiments of the present disclosure utilizing such technology can be particularly beneficial for a variety of reasons. For example, such direct manufacture allows for less waste of materials due to less processing steps and increased specialization of the template, wells, attachment materials, and/or other components of the appliances described herein.

In some embodiments, the template can be formed and one or more wells filled with attachment formation material. Such technologies can be particularly useful in some such embodiments as the surface of the attachment material and/or the adhesive material that will contact the tooth can be formed in a specialized shape as directed by the computing device.

Additionally, virtual modeling can be beneficial, for example, because the volume of a well can be calculated and the amount of material and/or type of material used to fill the well can be accurately calculated, thereby reducing waste and leaving less potential for error by the treatment professional. This can be further improved in some implementations when the attachment material is placed in the well prior to delivery to the treatment professional or when a computing device directs the manufacture of the attachment and/or template via direct fabrication.

The embodiments of the present disclosure can provide a number of benefits. For example, the embodiments can save time and cost in manufacture, improve the accuracy of the type of attachment material used, the preparation of the material, formation of the attachments, the positioning and/or orientation of the placement of the attachments, allow more ability to create specialized attachment sizes and shapes, and can save time and improve the experience of the patient and/or treatment professional in creating and/or securing attachments, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of forming a dental attachment formation apparatus, the method comprising:
   receiving a virtual model of a patient's dentition prior to an orthodontic treatment or at an intermediate stage of the orthodontic treatment;
   creating a virtual dental attachment formation apparatus based on the virtual model of the patient's dentition, wherein the virtual dental attachment formation apparatus includes:
      a body having a surface shaped to conform to contours of the virtual model of the patient's dentition;
      a well in the body, wherein the well is shaped to receive a dental attachment; and
      a light path directed through the body to the well;
   manufacturing, via rapid prototyping or direct fabrication, a physical dental attachment formation apparatus based on the virtual dental attachment formation apparatus, the physical dental attachment formation apparatus including a body, well, and light path corresponding to the body, well, and light path of the virtual dental attachment formation apparatus, at least a portion of the body of the physical dental attachment formation apparatus being made of a light transmissive material, wherein the physical dental attachment formation apparatus further comprises an opaque portion arranged to keep light from illuminating another portion of the body other than the well; and
   coupling a light source to the body of the physical dental attachment formation apparatus so that light from the light source is directed towards the well of the physical dental attachment formation apparatus through the light path of the physical dental attachment formation apparatus.

2. The method of claim 1, further comprising curing an attachment material for the dental attachment within the well of the physical dental attachment formation apparatus using light from the light source.

3. The method of claim 1, wherein the virtual model is in a computer-aided design (CAD) format.

4. The method of claim 1, wherein manufacturing the physical dental attachment formation apparatus further comprises arranging one terminus of the light path at a fitting attachment region of the physical dental attachment formation apparatus, the fitting attachment region configured to direct light into the light path.

5. The method of claim 1, wherein the well of each of the virtual and physical dental attachment formation apparatuses is a first well configured to receive a first dental attachment, wherein each of the virtual and physical dental attachment formation apparatuses includes a second well shaped to receive a second dental attachment.

6. The method of claim 5, wherein the light path of each of the virtual and physical dental attachment formation apparatuses is a first light path, wherein each of the virtual and physical dental attachment formation apparatuses further comprises a second light path defining a second path through the body to the second well.

7. The method of claim 6, wherein the opaque portion of the physical dental attachment formation apparatus is arranged to keep light from illuminating the second well of the physical dental attachment formation apparatus when the light is passed through the first light path of the physical dental attachment formation apparatus.

8. The method of claim 1, wherein manufacturing the physical dental attachment formation apparatus further comprises filling the well with a dental attachment material.

9. The method of claim 8, wherein filling the well with the dental attachment material comprises using direct fabrication.

10. The method of claim 1, wherein creating the virtual dental attachment formation apparatus includes calculating a volume of the well based on an amount and/or type of attachment material used to fill the well.

11. The method of claim 1, wherein the virtual model of the patient's dentition includes an identification of a placement position and/or orientation of the dental attachment on the patient's dentition.

12. The method of claim 1, wherein creating the virtual dental attachment formation apparatus comprises virtually testing a shape, location, orientation and/or type of the dental attachment.

13. A system for forming a dental attachment formation apparatus, the system comprising:
   one or more processors; and
   memory operationally coupled to the one or more processors, the memory configured to store computer-program instructions that, when executed by the one or more processors, perform a computer-implemented method comprising:
      receiving a virtual model of a patient's dentition prior to an orthodontic treatment or at an intermediate stage of the orthodontic treatment;
      creating a virtual dental attachment formation apparatus based on the virtual model the patient's dentition, wherein the virtual dental attachment formation apparatus comprises:
         a body having a surface shaped to conform to contours of the virtual model of the patient's dentition,
         a well in the body, wherein the well is shaped to receive a dental attachment, and
         a light path directed through the body to the well; and
      manufacturing, via rapid prototyping or direct fabrication, a physical dental attachment formation apparatus based on the virtual dental attachment formation apparatus, the physical dental attachment formation apparatus including a body, well, and light path corresponding to the body, well, and light path of the virtual dental attachment formation apparatus, at least a portion of the body of the physical dental attachment formation apparatus being made of a light transmissive material, wherein the physical dental attachment formation apparatus further comprises an opaque portion arranged to keep light from illuminating another portion of the body other than the well.

14. The system of claim 13, wherein one terminus of the light path of the physical dental attachment formation apparatus is arranged at a fitting attachment region of the body of the physical dental attachment formation apparatus, the fitting attachment region configured to direct light into the light path of the body of the physical dental attachment formation apparatus.

15. The system of claim 13, wherein manufacturing the physical dental attachment formation apparatus comprises forming the opaque portion using an opaque material.

16. The system of claim 13, wherein manufacturing the physical dental attachment formation apparatus further comprises filling the well with a dental attachment material.

17. The system of claim 13, wherein the well of the physical dental attachment formation apparatus is a first well configured to form a first dental attachment, the method further comprising forming a second well in the body of the dental attachment formation apparatus, the second well shaped to form a second dental attachment.

18. The system of claim 13, wherein manufacturing the physical dental attachment formation apparatus includes directly fabricating the dental attachment formation apparatus from computer instructions based on the virtual dental attachment formation apparatus.

* * * * *